United States Patent [19]

Haney, III

[11] Patent Number: 5,056,183
[45] Date of Patent: Oct. 15, 1991

[54] WINDSHIELD WIPER BLADE

[76] Inventor: Alonzo Haney, III, 739 Broadway, North Chicago, Ill. 60064

[21] Appl. No.: 194,432

[22] Filed: May 12, 1988

Related U.S. Application Data

[63] Continuation-in-part of Ser. No. 43,204, Apr. 23, 1987, abandoned.

[51] Int. Cl.$^5$ ............................................. B60S 1/04
[52] U.S. Cl. ................................................ 15/250.36
[58] Field of Search .................... 15/250.36–251.42, 15/245, 236.02, 250.03

[56] References Cited

U.S. PATENT DOCUMENTS

| | | | |
|---|---|---|---|
| 2,324,365 | 5/1943 | Coutts | 15/250.41 |
| 2,946,076 | 7/1960 | Morgan | 15/236.02 |
| 3,081,477 | 5/1963 | Ridenour | 15/250.32 |
| 3,224,027 | 12/1965 | Oishei et al. | 15/250.41 |
| 3,238,555 | 3/1966 | Cels | 15/250.36 |
| 3,417,421 | 12/1968 | Retke | 15/250.41 |
| 3,757,379 | 9/1973 | Benson | 15/250.42 |
| 3,879,794 | 4/1975 | Roberts, Jr. | 15/250.42 |
| 4,028,770 | 6/1977 | Appel | 15/250.42 |
| 4,317,251 | 3/1982 | Priesemuth | 15/250.42 |
| 4,339,839 | 7/1982 | Knights | 15/250.41 |
| 4,553,283 | 11/1985 | Speth | 15/250.41 |
| 4,561,143 | 12/1985 | Beneteau | 15/250.42 |
| 4,587,686 | 5/1986 | Thompson | 15/250.36 |

FOREIGN PATENT DOCUMENTS

| | | | |
|---|---|---|---|
| 583367 | 9/1933 | Fed. Rep. of Germany | 15/250.41 |
| 854398 | 1/1940 | France | 15/250.36 |
| 60242 | 4/1954 | France | 15/250.41 |
| 97939 | 5/1961 | Norway | 15/245 |
| 461560 | 2/1937 | United Kingdom | 15/250.41 |
| 1316781 | 5/1973 | United Kingdom | 15/250.03 |
| 2093339 | 9/1982 | United Kingdom | 15/250.39 |
| 8302756 | 8/1983 | World Int. Prop. O. | 15/250.03 |

Primary Examiner—Harvey C. Hornsby
Assistant Examiner—Joseph S. Machuga

[57] ABSTRACT

A windshield wiper blade which is adapted to be mounted on a conventional windshield wiper bracket assembly wherein the windshield wiper blade scrapes snow, ice or water from the window of the vehicle, displaces the scraped material into a reservoir, and transiently stores the scraped material in the reservoir. The reservoir is defined by a curvilinear sidewall and is located in a plane above the scraped surfaces of the window. The scraped material is expelled from the reservoir of the wiper blade and hence off of the windshield of the vehicle. The size and shape of the wiper blade insures that the wiper blade will maintain contact with the window surface to prevent "hydroplaning" of the blade as the blade is being used when the vehicle on which it is mounted is travelling at high rates of speed.

3 Claims, 2 Drawing Sheets

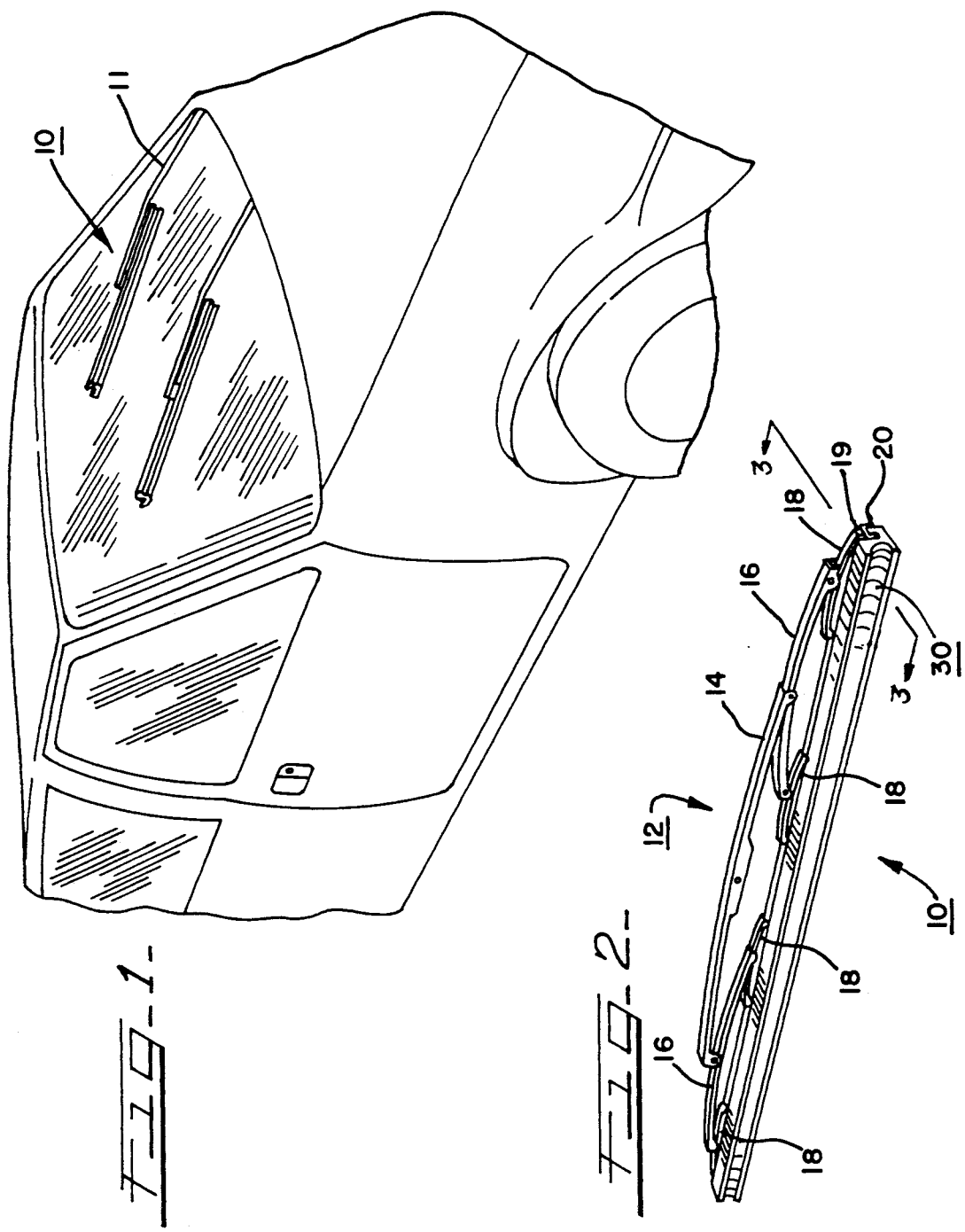

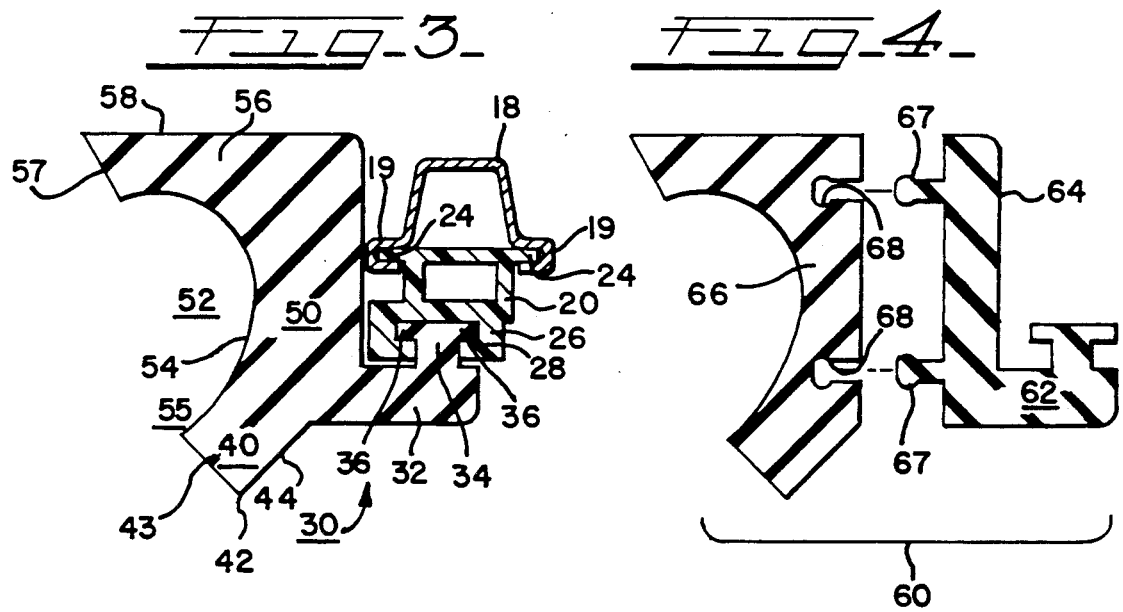
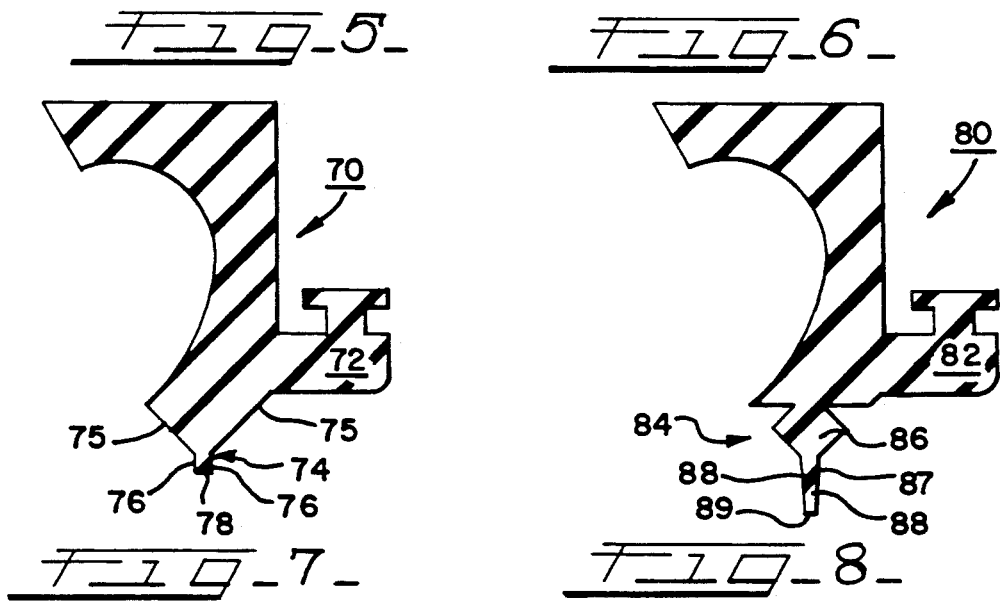
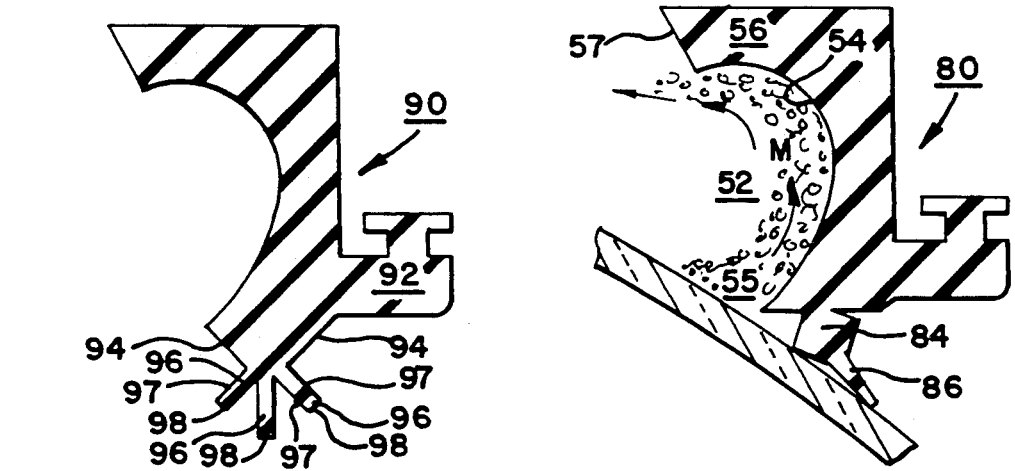

WINDSHIELD WIPER BLADE

This application is a continuation-in-part of my co-pending application Ser. No. 043,204, filed Apr. 23, 1987, now abandoned.

BACKGROUND OF THE INVENTION

This invention relates in general to windshield wiper blades and, more specifically, to a windshield wiper blade that is particularly suited for removing accumulations of snow, ice, rain and other material from the windshield of a vehicle.

Heretofore, numerous types of designs for windshield wiper blades have been used in connection with removing snow, ice, rain and other material from windshields of automobile and truck vehicles. The most common type of design previously used is one in which a rubber tip having a relatively small cross-section contacts the windshield along a line so as to scrape snow, ice or water that accumulates on the windshield of the vehicle.

Typically, a vehicle employs two windshield wiper blade assemblies each having rubber tips adapted to scrape snow, ice, water and other material off the front windshield. These scraping blades are attached to a wiper arm on the vehicle and travel in a generally arcuate path. One blade will clean that portion of the window on the driver's side of the vehicle, and the other blade will clean that portion of the window on of the passengers side of the vehicle.

When the wiper blade assemblies are not in use, the wiper blade will remain in a position substantially parallel with the ground upon which the vehicle rests.

When the wiper blades are being operated, they will move upward in generally arcuate paths to a generally vertical position which is substantially perpendicular to the normal or rest position of the windshield wiper blades. As the blades travel through the arcuate path, the blades come to a momentary resting point or sudden stop at such vertical position and then reverses its movement back along the same arcuate path. After a period of use, the snow, ice or water that is scraped from the window tends to accumulate at the momentary resting point of the windshield wiper blade. This accumulation creates a condition commonly known as "banking" in which large amounts of ice or snow accumulate on certain surfaces of the window. This accumulation hampers the effective operation of the windshield wiper blade. If the windshield wiper blades are being used in an exceptionally heavy rain or snow fall, this banking problem can sometimes require the operator of the vehicle to stop the vehicle and exit the vehicle to manually remove the accumulated material from the window surface. Banking is not only undesirable, but can create hazardous driving conditions during heavy snow, ice or rainfall.

Further, conventional wiper blade assemblies are relatively small and lightweight and are constructed so that air will easily pass through portions of the entire assembly. The small lightweight nature of the blades will also hamper the performance of the wiper blade when the blade is being operated in a vehicle travelling at high rates of speed. The small size and permeability of air through the assembly tends to foster a condition known as "hydroplaning" wherein the blade itself will actually lift up or break contact with the window. Of course, when this hydroplaning condition occurs, the effectiveness of the blade is greatly diminished.

The windshield wiper blade of this invention is intended to overcome the deficiencies or prior windshield wiper blade assemblies by providing not only a blade for scraping the windshield of a vehicle, but also a reservoir or storage area in which snow, water and ice can be collected during the operation of the windshield wiper blade. The material collected is then effectively expelled off of the windshield of the vehicle in order to prevent the undesireable condition of "banking" or accumulation of snow or ice on the windshield of a vehicle during the operation of windshield wiper blades.

The blade of the instant invention is intended to be operated in connection with conventional windshield wiper blade mounting systems. A variety of scraping tips can effectively be used in connection with the present invention.

SUMMARY OF INVENTION

It is therefor a general object of the present invention to provide a windshield wiper blade having significantly improved performance.

A more specific object of the present invention is to provide a windshield wiper blade which effectively removes snow, ice and water from the windshield of a vehicle.

Another object of the invention is to provide a windshield wiper blade that is configured so as to permit collection and transient storage of snow, ice, water or other material during the window scraping operations.

Still another object of the invention is to permit the snow, ice, water or other materials which are stored in the windshield wiper blade to be expelled from the windshield wiper assembly and off the window of the vehicle to maintain the windshield of the vehicle clear in such a way that the vision of the vehicle driver is not obstructed.

A further object of the present invention is to insure that the windshield of the vehicle is maintained in as clean a condition as possible during operation of the wiper blades.

A further object of the present invention is to prevent the accumulation of excessive amounts snow and ice on portions of the vehicle window during operation of the windshield wiper blade.

A still further object of the invention is to insure that the wiper blade maintains contact with the windshield during operation of the vehicle even when the vehicle is travelling at high rates of speed.

It is a further object of the invention to provide a windshield wiper blade that scrapes material from the windshield of vehicles, accumulates the material into a cohesive mass of material on the blade and expels the material from the blade by a combination of the cohesion of the accumulated material and the inertia of the cohesive mass, and the movement and sudden mementary stop of the blade assembly.

To this end, the invention disclosed and claimed herein comprises a windshield wiper blade which is adapted to be mounted on a conventional windshield wiper bracket assembly wherein the windshield wiper blade scrapes snow, ice or water from the window of the vehicle, displaces the scraped material into a reservoir, and transiently stores the scraped material in the reservoir. The reservoir is defined by a curvilinear sidewall and is located in a plane above the scraped surface of the window. The scraped material is expelled from the reservoir of the wiper blade and hence off of the windshield of the vehicle. The size and shape of the wiper blade insures that the wiper blade will maintain contact with the window surface to prevent "hydroplaning" of the blade as the blade is being used when the vehicle on which it is mounted is travelling at high rates of speed.

The manner in which the aforesaid objects and advantages of the invention are achieved in practice will become more clearly apparent when reference is made to the accompanying detailed description of the preferred embodiment of the invention which is set forth herein by way of example, and show in the accompanying drawings, wherein like reference numerals indicate corresponding parts throughout.

BRIEF DESCRIPTION OF THE DRAWINGS

FIG. 1 is a partial perspective view of an automobile on which the windshield wiper blade assembly of the present invention is mounted.

FIG. 2 is a perspective view of the windshield wiper blade assembly of the present invention mounted on a conventional windshield wiper mounting bracket.

FIG. 3 is a cross-sectional view of the wiper blade assembly and bracket of the present invention taken along line 3—3 in FIG. 2.

FIG. 4 is a cross-sectional view of an alternate embodiment for the windshield wiper blade portion of the present invention.

FIG. 5 is a cross-sectional view of another alternate embodiment of the windshield wiper blade of the present invention.

FIG. 6 is a cross-sectional view of a further embodiment of the windshield wiper blade of the present invention.

FIG. 7 is a cross-sectional view of a still further embodiment of the windshield wiper blade of the present invention.

FIG. 8 is a cross-sectional view of the windshield wiper blade of FIG. 6 showing the method of accumulation, storage and expulsion of materials from the wiper blade.

DETAILED DESCRIPTION OF THE PREFERRED INVENTION

Referring now to the drawings, there is shown a windshield wiper assembly 10 which is adapted to be mounted on a wiper arm 11 of a vehicle in a well-known and conventional manner. The windshield wiper assembly 10 generally includes a mounting bracket 12 and a blade assembly 30.

The mounting bracket 12 includes a main support arm 14 which is adapted to be mounted to the wiper arm 11 of the vehicle. The bracket 12 also includes two secondary support arms 16, each of which is attached to opposite ends of the arm 14. The secondary support arms 16 include a pair of auxiliary brackets 18 which are adapted to engage and position the blade assembly 30.

The blade assembly 30 is attached to the mounting bracket 12 by a blade mounting track 20, which is preferably made of a semi-rigid material. The outboard ends of each bracket 18 form a claw 19 in order to facilitate mounting of the track 20 and blade assembly 30 onto the bracket 12.

The track 20 includes a pair of upper lands 24 for engaging the claw ends 19 of the brackets 18. The track 20 also includes a base portion 26 having walls defining a channel 28 for receiving and supporting the blade assembly 30.

The blade assembly 30 is adapted to be tightly secured within the channel 28 on the track 20 in such a way that the blade assembly 30 is rigidly held in place during operation, while permitting relatively easy manual removal of the blade assembly 30 from the blade track 20. While the track 20 provides additional support for the entire assembly 10, the track 20 can be made of an elastomeric material, or in the alternative, can be removed entirely from the construction. In that event, the blade assembly 30 can be made so that it can be mounted directly onto the mounting bracket 12.

The wiper blade assembly 30 comprises a body which includes a base or mounting portion 32, a scraper element 40, a reservoir portion 50, and a dam portion 56.

The base portion 32 includes a rib or projection 34 which has a pair of lands 36, which are adapted to be received within the channel 28 of the track 20 to rigidly secure the blade assembly 30 to the track and mounting bracket 12.

The scraper element 40 extends outwardly and downwardly from the mounting portion 32 and includes a scraping tip 42 which is adapted to contact the windshield of the vehicle. The tip 42 is utilized to scrape the snow, ice, water or other material off the windshield surface to maintain the window clean to provide a clear line of vision for the driver of the vehicle. The tip 42 is formed by a pair of converging margins 43, 44.

The reservoir portion 50 of the blade assembly 30 extends upwardly from the scraper element 40 and outwardly and upwardly from the mounting portion 32. The reservoir poriton 50 includes a reservoir 52 which is defined by a curvilinear sidewall 54. The reservoir 52 will accumulate snow, ice, water and other material therein as such material is scraped off the windshield by the scraper element 40 and displaced in the reservoir during operation of the blade assembly 30.

The material scraped off the windshield by the scraper element 43 enters the reservoir 52 at an inlet area 55 and is transiently stored in the reservoir 52. The scraped material moves along the margin 43 and up the sidewall 54. The scraped material will move along the sidewall 54 until it reaches the dam portion 56, which confines the scraped material in the reservoir 52 and prevents such material from escaping from the reservoir 52. The dam portion 57 extends outwardly from the reservoir portion a substantial distance and terminates in a bevelled edge 57. The bevelled edge 57 and the dam 56 prevent the overflow of the scraped material onto the outer margin 58 of the dam 56. The dam 56 is constructed so as to aid in accumulation and transient storage of the scraped material in reservoir 52 of the blade assembly 30.

As the scraped material is accumulated into a cohesive mass and stored in the reservoir 52, the arcuate movement of wiper assembly 10 and the inertia of the mass of scraped material will result in an expulsion of the scraped material from the reservoir 52, off the blade assembly 30 and the windshield of the vehicle.

Referring now to FIGS. 4 through 7, there is shown four alternate embodiments for the blade portion of the instant invention. Each of the blade assemblies 60, 70, 80 and 90 (shown in FIGS. 4 through 7) include a base portion 62, 72, 82 and 92, respectively, each of which is identical to the base portion 32 of the blade assembly 30 of FIG. 3. Hence, each wiper blade assembly 60, 70, 80 and 90 is adapted to be mounted to the track 20 and the mounting bracket 12 in the same manner as the blade assembly 30 of FIG. 3 is mounted to the track 20 and bracket 12. Additionally, each blade assembly 60, 70, 80 and 90 include a reservoir portion, and a dam portion identical to the reservoir portion 50 and dam portion 56 of the blade assembly of FIG. 3.

With respect to FIG. 4, the blade assembly 60 is identical to the blade assembly 30 (FIG. 3) except that the blade assembly 60 is a two-piece structure. The blade assembly 60 comprises a mounting piece 64 and a scraping and reservoir section 66. The mounting piece 64 includes a pair of tabs 67 having enlarged head portions. The tabs 67 are adapted to be registered with a pair of complementary slots 68 in the reservoir section 66. The blade assembly 60 is made of two-pieces to facilitate easy removal and replacement of the scraping and reservoir section 66 without requiring removal of the entire blade assembly from the bracket. If desired, the tabs 67 can be adhesively secured or cemented in the slots 68 to provide more stability. Once the tabs 67 and slots 68 are securely registered, the blade assembly 30 of FIG. 4 will operate in a manner identical to the blade assembly 30 of FIG. 3.

The embodiments of FIGS. 5-7 disclose wiper blade assemblies having different configurations for the scraping element from the configuration of the scraping element 40 of the blade assembly 30. The blade assemblies 70, 80 and 90 are otherwise identical to the blade assembly 30 and operate in substantially the same manner as the blade assembly 30.

Referring to FIG. 5, the blade assembly 70 includes a generally downwardly extending tip portion 74 having a pair of tapered margins 75 and a pair of vertical margins 76 terminating in a flat edge 78. The edge 78 contacts the windshield and scrapes the material off of the window of the vehicle.

The blade 80 (FIG. 6) has a tip portion 84 which includes an enlarged diamond shaped section 86 and a tapering section 87 having margins 88 terminating in a flat edge 89. The section 86 is intended to deflect against the windshield of the vehicle (FIG. 8) during operation of the blade assembly 60 so that portions of the section 86, the margins 88, and the edge 89 will contact the windshield of the vehicle during use.

The blade 90 shown in FIG. 7 includes a pair of converging margins 94 terminating at a plurality of generally downwardly extending tips 96, each tip 96 having downwardly extending margins 97 terminating in a flat edge 98. The tips 96 are also intended to deflect during operation of the blade assembly 90 so that the margins 97 will contact the windshield and assist the edges 98 in effectively scraping the windshield of the vehicle.

FIG. 8 shows the blade assembly 80 of FIG. 6 in use on the windshield of a vehicle. The tip portion 84 is shown deflecting on the windshield and scraping material off the windshield. The scraped material is displaced from the windshield and enters the inlet area 55 of the reservoir 52. The scraped materials rides along the sidewall 54 and is prevented from escaping from the reservoir by the dam 56. In this way, the scraped material will remain in the reservoir until the blade assembly 80 is ready to expel the scraped material from the assembly.

In each of the embodiments disclosed in FIGS. 1 to 7, the blade assembly is of an enlarged size. A significant portion of the blade assembly (30, 60, 70, 80, 90) extends upwardly and terminates in a plane significantly above the plane in which the assembly is mounted to the mounting bracket 12. The portion of the blade which extends above the mounting bracket 12 provides stability for the entire wiper blade and insures that the tip of the blade assembly will remain in contact with the windshield in such a way to prevent lift off or hydroplaning of the blade assembly while the windshield wipers are in operation on a vehicle that is being driven at high rates of speed.

Referring again to FIG. 3, during non-use of the wiper blade assembly 10, the tip 42 contacts the lower edge of the windshield of the vehicle. Upon actuation of the wiper blade assembly, the tip 42 travels along a line in an arcuate path to a position generally perpendicular to the rest position of the blade assembly. During movement, the tip 42 first scrapes ice, snow, water and other material from the surface of the windshield, then displaces the scraped material along the margin 43. The scraped material enters the inlet area 55 of the reservoir 52 for transient storage of the scraped material. When the blade assembly reaches a position generally perpendicular to the rest position of the blade assembly, the scraped material is then thrown out of the reservoir in such a way that the scraped material will not accumulate in any significant quantities on the windshield of the vehicle or other parts of the vehicle in close proximity to the windshield.

While it is not known with certainty the exact theory on the successful operation of the windshield wiper assembly, it is believed that as the wiper blade moves from the first or rest position the wiper blade scrapes material such as snow off the windshield and deposits the scraped material into the reservoir. As the scraped material accumulates in the reservoir, the scraped material forms a mass of cohesive material. As the wiper blade moves through an arc of motion to the generally vertical position, the wiper assembly comes to a momentary sudden stop and reverses movement of the blade assembly through the arc of motion back to the first or rest position. At the point of the sudden stop, the combination of the movement of the wiper assembly, the cohesion of the scraped material, the inertia of the cohesive mass of scraped material and the sudden stop, act to expel the scraped material out of the blade assembly thereby preventing accumulation of scraped material at the edges of the windshield. It is also believed that the size and positioning of the blade assembly 30 assists in providing the necessary thrust to throw the accumulated material from blade assembly off the windshield surfaces.

In addition to being utilized on front windshields of automobiles, and trucks, the blade assembly of the present invention can also be adapted for use on windshield wiper assemblies that have a top pivot mount, similar to the blade assemblies used on buses, some types of trucks and rear windshields of automobiles. Additionally, the wiper blade of the present invention can be utilized in automotive application where a single wiper unit moves through a path of motion to clean an entire front windshield of a vehicle.

While the invention has been described with reference to a preferred embodiment, it will be understood by those skilled in the art that various changes may be made and equivalents may be substituted therefor without the departing from the spirit of the invention or the scope of the appended claims. In addition, modifications to the specifics will occur to those skilled in the art. Therefore, it is intended that the invention will not be limited to the particular embodiment disclosed as the best mode contemplated for carrying out the invention, but that the invention will include all embodiments falling within the scope of the appended claims.

I claim:

1. A windshield wiper blade mountable to a wiper arm of a vehicle for scraping material from the windshield upon movement of said wiper arm, said wiper arm being reciprocatably movable along an arcuate path in a plane generally parallel and adjacent to said windshield between a rest position wherein the wiper arm and wiper blade extend parallel to an edge of the windshield, and a second extended position, wherein the wiper arm and the blade are disposed generally perpendicular to said rest position, said wiper blade comprising an elongate blade body including a base portion extending generally at an acute angle with respect to said windshield, said base portion having a rearward windshield facing end with a pointed tip formation and an opposing forward facing end, an upper body portion having a generally inverted L-shaped cross-sectional configuration defined by a first arm extending upwardly from the rearward end of the base to a free end spaced from the base, and a second arm cantilevered from the free end of the first arm, extending rearwardly perpendicularly from the free end of the first arm to a bevelled free end spaced above and rearwardly of said pointed tip formation, said upper body portion further including an elongate continuous, concave curvilinear sidewall surface extending between said pointed tip formation and said bevelled free end and defining a reservoir for accumulating scraped material, said pointed tip formation and said bevelled free end each being maintained in spaced relation to said windshield surface, said blade body further including a scrapper tip portion depending normally from a point adjacent the rearward end of the base, opposite said upper body portion, and positioned for wipingly, scrapingly engaging the windshield surface, said blade body further including a leading margin surface extending between said scraper tip portion and said pointed tip formation, said blade body further including mounting means extending upwardly from the front end of the base portion for mounting said blade body to said wiper arm, said wiper blade being configured and mounted so that as the wiper arm is moved from said rest position to said second extended position, materials on said windshield are scrapingly removed by said scraper tip portion, and upon continued movement of said wiper arm, said scraped materials are displaced upwardly from the windshield surface along said leading margin surface, over said pointed tip formation and into said reservoir; and upon stopping movement of the wiper arm at said second extended position, any accumulated materials present in said reservoir are ejected generally parallel to said windshield surface, thereby avoiding accumulation of wiped materials on the windshield.

2. A windshield wiper blade as defined in claim 1, wherein said blade body is a one-piece, unitary body.

3. A windshield wiper blade as defined in claim 1, wherein said blade body comprises a two-piece blade body.

* * * * *